(12) United States Patent
Sun et al.

(10) Patent No.: US 12,068,990 B2
(45) Date of Patent: Aug. 20, 2024

(54) PHYSICAL DOWNLINK CONTROL CHANNEL TRANSMISSION AND RECEPTION TECHNIQUES FOR DYNAMIC SPECTRUM SHARING

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Hong He, San Jose, CA (US); Hossam K. Shokr, Munich (DE); Huaning Niu, San Jose, CA (US); Niranjan N. Ratnakar, San Diego, CA (US); Oghenekome Oteri, San Diego, CA (US); Sami M. Almalfouh, San Jose, CA (US); Wei Zeng, Saratoga, CA (US); Wei Zhang, Santa Clara, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 17/593,608

(22) PCT Filed: Oct. 13, 2020

(86) PCT No.: PCT/CN2020/120682
§ 371 (c)(1),
(2) Date: Sep. 21, 2021

(87) PCT Pub. No.: WO2022/077230
PCT Pub. Date: Apr. 21, 2022

(65) Prior Publication Data
US 2022/0311576 A1  Sep. 29, 2022

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0013* (2013.01); *H04W 16/14* (2013.01); *H04W 72/23* (2023.01); *H04W 88/06* (2013.01)

(58) Field of Classification Search
CPC .... H04L 5/0048; H04L 1/0013; H04W 72/23; H04W 16/14; H04W 88/06
See application file for complete search history.

(56) References Cited

U.S. PATENT DOCUMENTS

2018/0070369 A1* 3/2018 Papasakellariou .... H04W 72/20
2018/0145818 A1* 5/2018 Choi ...................... H04L 5/023
(Continued)

FOREIGN PATENT DOCUMENTS

CN    110612758    12/2019
CN    111096029     5/2020
(Continued)

*Primary Examiner* — Jael M Ulysse
(74) *Attorney, Agent, or Firm* — Fay Kaplun & Marcin, LLP (57) ABSTRACT

A user equipment (UE) is configured to perform rate matching for reference signals under certain conditions. The UE receives information associated with a downlink reference signal for a first radio access technology (RAT), wherein the first RAT is different than a currently camped second RAT, identifies reference signal occasions for the downlink reference signal and receives downlink control information from the second RAT via a physical downlink control channel (PDCCH).

20 Claims, 5 Drawing Sheets

(51) Int. Cl.
  *H04W 16/14*   (2009.01)
  *H04W 72/23*   (2023.01)
  *H04W 88/06*   (2009.01)

(56) References Cited

U.S. PATENT DOCUMENTS

| | | | | |
|---|---|---|---|---|
| 2019/0268889 | A1* | 8/2019 | Kim | H04L 5/0053 |
| 2019/0334691 | A1* | 10/2019 | Bendlin | H04L 5/1469 |
| 2019/0387547 | A1* | 12/2019 | Shin | H04W 74/0866 |
| 2020/0053758 | A1* | 2/2020 | Hosseini | H04W 16/14 |
| 2020/0083994 | A1* | 3/2020 | Marinier | H04L 5/001 |
| 2020/0107307 | A1* | 4/2020 | Nammi | H04L 5/0051 |
| 2020/0382354 | A1* | 12/2020 | Sengupta | H04L 5/001 |
| 2021/0058953 | A1* | 2/2021 | Bendlin | H04W 16/14 |
| 2021/0243609 | A1* | 8/2021 | Lei | H04L 5/0057 |
| 2021/0282104 | A1* | 9/2021 | Sagar | H04W 76/16 |
| 2023/0041809 | A1* | 2/2023 | Harada | H04L 1/0067 |

FOREIGN PATENT DOCUMENTS

| | | | | |
|---|---|---|---|---|
| WO | 2020/033973 | | 2/2020 | |
| WO | WO-2020033973 A1 | * | 2/2020 | H04L 5/005 |

* cited by examiner

PHYSICAL DOWNLINK CONTROL CHANNEL TRANSMISSION AND RECEPTION TECHNIQUES FOR DYNAMIC SPECTRUM SHARING

BACKGROUND

Dynamic spectrum sharing may include deploying multiple radio access technologies (RATs) in the same frequency band and dynamically allocating spectrum resources between these RATs. When multiple RATs share the same frequency band, a collision may occur between the signals of the different RATS. For example, a Long Term Evolution (LTE) RAT and a 5G new radio (NR) RAT may be deployed in the same frequency band. In this type of scenario, 5G NR downlink control information (DCI) transported via a physical downlink control channel (PDCCH) may collide with LTE downlink reference signals. This may cause a degradation in performance for both 5G NR and LTE operations. Accordingly, there is a need for techniques configured to ensure that 5G NR PDCCH signaling does not collide with LTE downlink reference signals.

SUMMARY

Some exemplary embodiments are related to a baseband processor configured to perform operations. The operations include receiving information associated with a downlink reference signal for a first radio access technology (RAT), wherein the first RAT is different than a currently camped second RAT, identifying reference signal occasions for the downlink reference signal and receiving downlink control information from the second RAT via a physical downlink control channel (PDCCH).

Other exemplary embodiments are related to user equipment (UE) including a transceiver configured to communicate with a network and a processor communicatively coupled to the transceiver and configured to perform operations. The operations include receiving information associated with a downlink reference signal for a first radio access technology (RAT), wherein the first RAT is different than a currently camped second RAT, identifying reference signal occasions for the downlink reference signal and receiving downlink control information from the second RAT via a physical downlink control channel (PDCCH).

DETAILED DESCRIPTION

The exemplary embodiments may be further understood with reference to the following description and the related appended drawings, wherein like elements are provided with the same reference numerals. The exemplary embodiments relate to 5G new radio (NR) physical downlink control channel (PDCCH) transmission and reception. As will be described in more detail below, in a first aspect, the exemplary embodiments include various exemplary rate matching techniques that may be implemented by a user equipment (UE) for PDCCH reception. In a second aspect, the exemplary embodiments include an exemplary PDCCH demodulation reference signal (DMRS) design.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to dynamic spectrum sharing (DSS) between a Long Term Evolution (LTE) radio access technology (RAT) and a 5G NR RAT. Those skilled in the art will understand that DSS refers to the deployment of multiple RATs in the same frequency band and the dynamic allocation of spectrum resources between those RATs. DSS may enable a network carrier to deploy 5G NR on top of the spectrum already being used for LTE. However, when multiple RATs share the same frequency band, a collision may occur between the signals of the different RATs. This may cause a performance degradation on the UE side and/or the network side for both LTE and 5G NR operations.

In accordance with various regulations and/or standards, DSS may be configured to ensure that LTE operations are not impacted by the presence of 5G NR communications in the same band. This is to ensure backwards compatibility for legacy LTE UEs. However, since 5G NR communications are to be invisible to LTE operations, DSS may rely on 5G NR operations to be configured to avoid collisions with the LTE communications. As will be described in more detail below, the exemplary embodiments include techniques for avoiding a collision between 5G NR PDCCH and certain LTE downlink reference signals.

The exemplary embodiments are also described with regard to downlink control information (DCI). Those skilled in the art will understand that DCI may refer to control information that indicates that a subsequent transmission and/or reception is to be performed by the UE. To provide an example, DCI may be transmitted to the UE by a currently camped cell via the PDCCH. In one example, the DCI may include scheduling information for downlink data that is to be received via a downlink data channel (e.g., physical downlink shared channel (PDSCH), etc.) or uplink data that is to be transmitted via an uplink data channel (physical uplink shared channel (PUSCH). In another example, the DCI may include scheduling information for other control information that is to be received by the UE (e.g., a medium access control (MAC) control element (CE)) or scheduling information for other control information that is to be transmitted by the UE (e.g., a sounding reference signal (SRS)). Thus, the UE may transmit and/or receive a signal in response to the DCI. The above examples are provided for illustrative purposes and are not intended to limit the exemplary embodiments in any way, those skilled in the art will understand the scope of the term "DCI."

As mentioned above, the UE may receive DCI from the network via the PDCCH. For a 5G NR UE, PDCCH reception may include rate matching around LTE cell specific reference signals (CRS). In one aspect, the exemplary embodiments relate to implementing 5G NR PDCCH rate matching techniques for DSS. Some of these exemplary techniques are configured to balance the complexity and resources required by the network to provide the PDCCH and the resources required by the UE to perform PDCCH reception. For example, some of the exemplary rate matching techniques described herein relate to implementing restrictions with regard to when or under what conditions rate matching LTE CRS is to be performed for PDCCH reception. These restrictions enable an operator to satisfy DSS requirements and do not place unreasonable requirements on either the UE or the network.

In a second aspect, the exemplary embodiments include implementing a PDCCH DMRS design. This exemplary PDCCH DMRS design decreases the likelihood of a collision between the PDCCH DMRS and the LTE CRS. The exemplary PDCCH DMRS design described herein may be used in conjunction with or independently from the exemplary rate matching techniques described herein. In addition, the exemplary rate matching techniques and PDCCH DMRS design described herein may be used in conjunction with other currently implemented DSS mechanisms, future implementations of DSS mechanisms or independently from other DSS mechanism.

Figure 1:
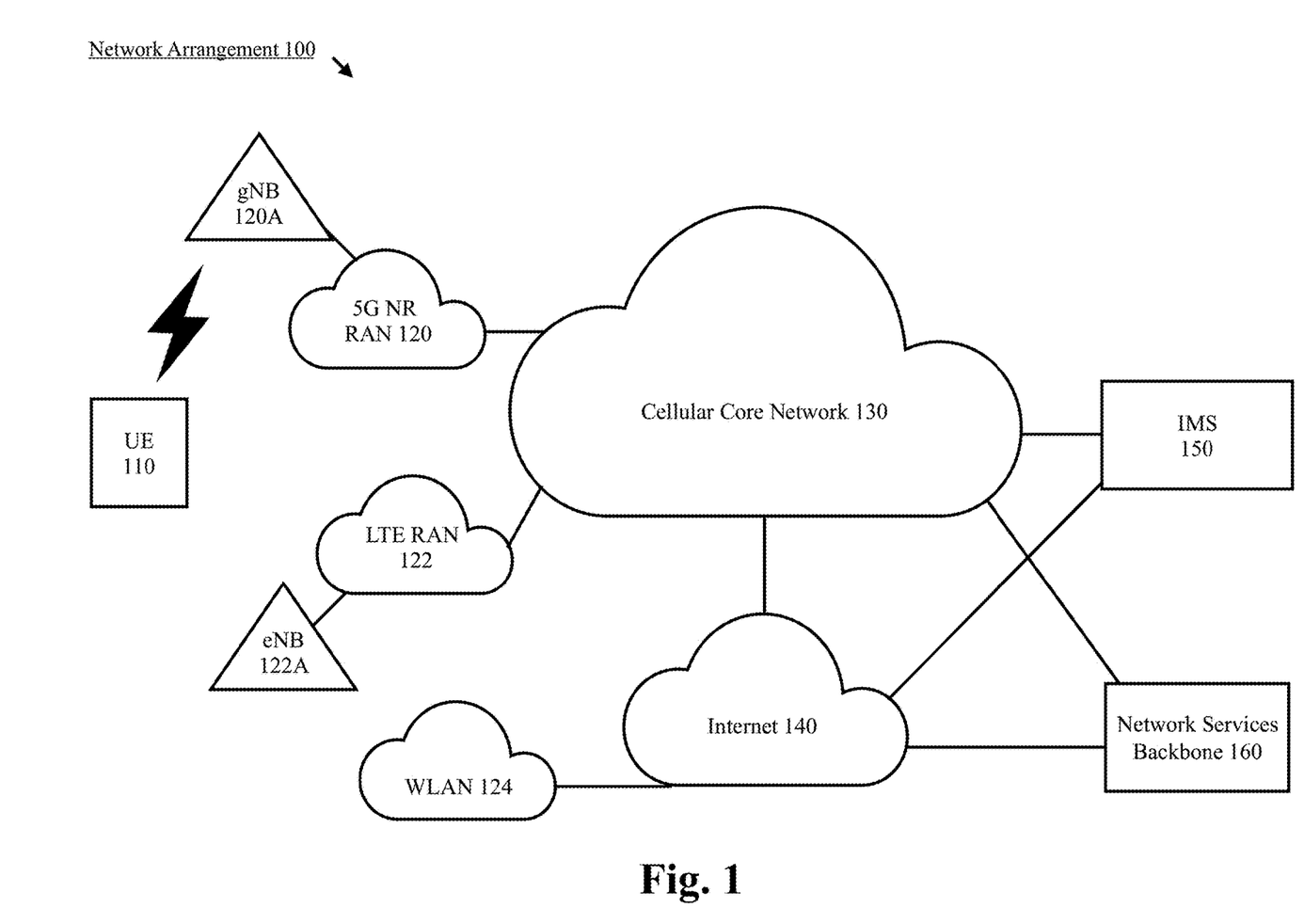
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120, an LTE RAN 122 and a wireless local area network (WLAN) 124. However, it should be understood that the UE 110 may also communicate with other types of networks (e.g. 5G cloud RAN, a next generate RAN (NG-RAN), a legacy cellular network, etc.) and the UE 110 may also communicate with networks over a wired connection. With regard to the exemplary embodiments, the UE 110 may establish a connection with the 5G NR RAN 120, the LTE RAN 122 and/or the WLAN 124. Therefore, the UE 110 may have a 5G NR chipset to communicate with the NR RAN 120, an LTE chipset to communicate with the LTE RAN 122 and an ISM chipset to communicate with the WLAN 124.

The 5G NR RAN 120 and the LTE RAN 122 may be portions of a cellular network that may be deployed by a network carrier (e.g., Verizon, AT&T, T-Mobile, etc.). The RANs 120, 122 may include, cells or base stations that are configured to send and receive traffic from UEs that are equipped with the appropriate cellular chip set. In this example, the 5G NR RAN 120 includes the gNB 120A and the LTE RAN 122 includes the eNB 122A. However, reference to a gNB and an eNB is merely provided for illustrative purposes, any appropriate base station or cell may be deployed (e.g., Node Bs, eNodeBs, HeNBs, eNBs, gNBs, gNodeBs, macrocells, microcells, small cells, femtocells, etc.). The WLAN 124 may include any type of wireless local area network (WiFi, Hot Spot, IEEE 802.11x networks, etc.).

The base stations (e.g., the gNB 120A, eNB 122A) may include one or more communication interfaces to exchange data and/or information with camped UEs, the corresponding RAN, the cellular core network 130, the internet 140, etc. Further, the base station may include a processor configured to perform various operations. For example, the processor of the base station may be configured to perform operations related to PDCCH transmission. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A).

As mentioned above, the exemplary embodiments relate to DSS. Thus, reference to a single 5G NR RAN 120 and a single LTE RAN 122 is merely provided for illustrative purposes. In some embodiments, a single RAN may be configured to deploy both LTE RAT and 5G NR RAT. In other embodiments, there may be multiple RANs deployed with overlapping coverage areas. Similarly, reference to a single gNB 120A and a single eNB 122A is also provided for illustrative purposes. In some embodiments, a single base station or cell may be configured for both LTE RAT and 5G NR RAT. In other embodiments, multiple 5G NR base stations and multiple LTE base stations may be deployed with overlapping coverage areas. The exemplary embodiments are not limited to any particular arrangement of RANS and base stations. The exemplary embodiments may apply to any network arrangement that includes DSS functionality.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
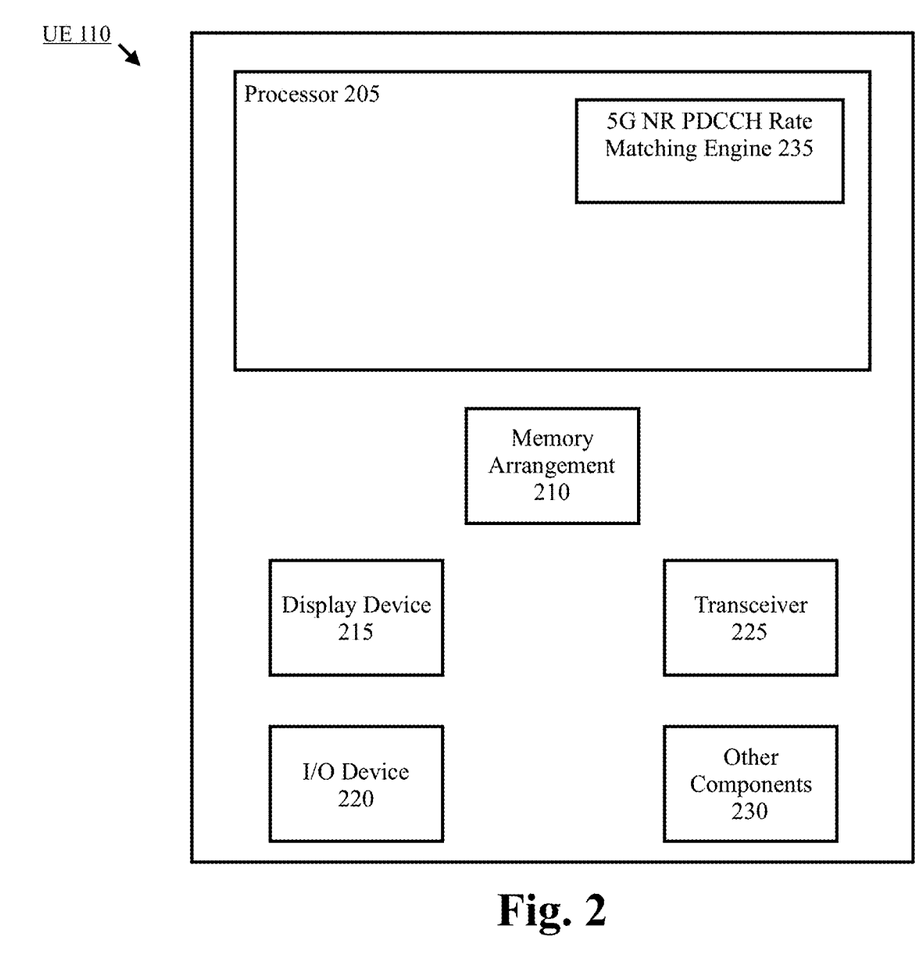
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a 5G NR PDCCH rate matching engine 235. The 5G NR PDCCH rate matching engine 235 may be configured to implement various exemplary rate matching techniques related to 5G NR PDCCH reception.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR RAN 120, the LTE RAN 122 and the WLAN 124. Accordingly, the transceiver 225 may operate on a variety of different frequencies or channels (e.g., set of consecutive frequencies).

Figure 3:
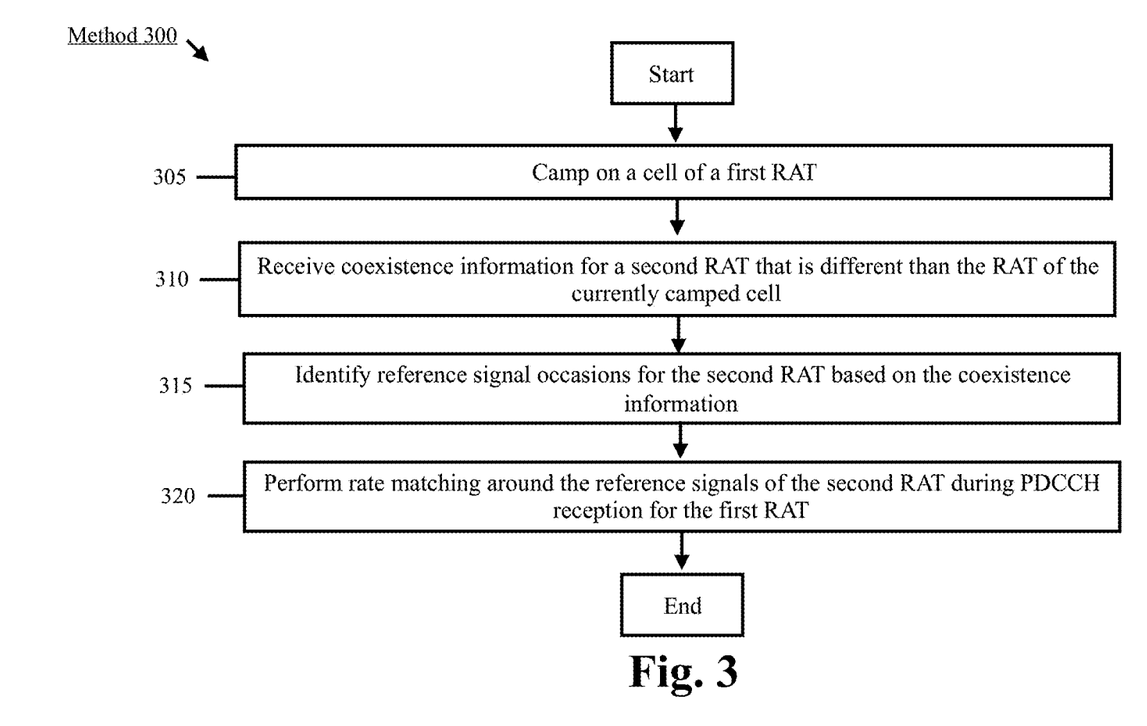
FIG. 3 shows a method for physical downlink control channel (PDCCH) reception according to various exemplary embodiments.

FIG. 3 shows a method 300 for PDCCH reception according to various exemplary embodiments. The method 300 will be described with regard to the network arrangement 100 of FIG. 1 and the UE 110 of FIG. 2.

In 305, the UE 110 camps on a cell of a first RAT. For example, the UE 110 may be camped on the gNB 120A of the 5G NR RAN 120. As indicated above, the exemplary embodiments relate to DSS. Thus, the 5G NR RAT and the LTE RAT may be deployed in the same frequency band. For example, a 5G NR PDCCH may be configured to use the same frequency band as an LTE CRS. In addition, when camped on the 5G NR cell, the UE 110 may indicate to the network that the UE 110 is capable of rate matching around LTE CRS during PDCCH reception. For example, the UE 110 may transmit capability information (or any other appropriate message) to the network that indicates the rate matching capabilities of the UE 110 on a per band basis.

In 310, the UE 110 may receive coexistence information for a second RAT that is different than the RAT of the currently camped cell. For example, the UE 110 may be configured for the 5G NR RAT and the coexistence information may be associated with LTE RAT. The coexistence information may enable the UE 110 to identify frequency and/or time locations for one or more types of LTE downlink reference signals that may be transmitted by an LTE cell (e.g., LTE CRS).

In this example, the UE 110 may not be required to detect the existence and pattern of the LTE CRS that is to be transmitted on the currently camped frequency band. Instead, the coexistence information may be provided by the currently camped 5G NR cell and explicitly or implicitly indicate the pattern (or rate) that is to be used by the LTE cell to transmit the LTE CRS. The UE 110 may receive this coexistence information from the 5G NR cell during radio resource control (RRC) signaling or from any other appropriate source. Thus, a cell of a first RAT may provide coexistence information for a second different RAT to the UE. However, the exemplary embodiments are not limited to scenarios in which the UE 110 is explicitly or implicitly provided coexistence information from the currently camped cell. The exemplary embodiments may collect information associated with the pattern (or rate) that is to be used by the cell to transmit LTE reference signals from any appropriate one or more sources external or internal to the UE 110.

In 315, the UE 110 identifies a reference signal (e.g., LTE CRS) occasions for the second RAT based on the coexistence information. In other words, the UE 110 identifies the pattern (or rate) for which LTE CRS are to be transmitted in the frequency band of the currently camped 5G NR cell.

In 320, the UE 110 performs rate matching around the reference signals for the second RAT during PDCCH reception for the first RAT. For example, the UE 110 may receive control information via the 5G NR PDCCH. Since the UE 110 is aware of the pattern (or rate) that is being used to transmit LTE CRS in the frequency band of the currently camped 5G NR cell, the UE 110 may perform rate matching around the LTE CRS during 5G NR PDCCH reception. Those skilled in the art will understand that, generally, rate matching is a processing technique that includes de-mapping one or more symbols of a downlink signal and skipping the identified reference signal (e.g., LTE CRS) occasions during the de-mapping operation.

The UE 110 may configure the baseband processor to perform rate matching around the LTE CRS based on certain predetermined conditions. Thus, the UE 110 may be configured to perform rate matching around the LTE CRS when a first set of one or more conditions is satisfied and the UE 110 may be restricted from performing rate matching around the LTE CRS when a second set of one or more conditions is satisfied.

Specific examples of when and/or under what conditions the UE 110 is to perform rate matching around the LTE CRS will be described in more detail below. Some of the exemplary rate matching techniques described below are configured to balance the complexity and resources required by the network to provide the PDCCH and the resources required by the UE 100 to perform PDCCH reception. For example, implementing these restrictions may enable an operator to satisfy DSS without placing unreasonable requirements on either the UE or the network. During operation, any combination of one or more of the exemplary rate matching techniques described herein may be implemented.

In one example, the UE 110 may be configured to perform rate matching around the LTE CRS for 5G NR PDCCH reception when decoding a search space and/or a control resource set (CORESET) that is configured after RRC connection setup. For example, during or after an RRC connection setup procedure, the UE 110 may be configured to receive 5G NR PDCCH in a particular search space or via a particular CORESET. In response, the UE 110 may configure the baseband processor to perform rate matching around the LTE CRS when receiving on the indicated search space or the indicated CORESET because it was configured after (or during) RRC connection setup. However, when the UE 110 is to receive PDCCH on a search space or via a CORESET that is configured prior to RRC connection setup or after an RRC connection has been terminated, the UE 110 may restrict the baseband processor from performing rate matching around the LTE CRS.

In another example, the UE 110 may be configured to perform rate matching around the LTE CRS for 5G NR PDCCH reception when processing a UE specific search space (USS). For example, the UE 110 may configure the baseband processor to perform rate matching around the LTE CRS when the UE 110 is to receive PDCCH on a USS. In this example, the UE 110 may restrict the baseband processor from performing rate matching around the LTE CRS when the UE 110 is to receive PDCCH on a common search space (CSS). Thus, the UE 110 may implement rate matching around the LTE CRS based on a first type of search space and omit rate matching around the LTE CRS based on a second different type of search space.

In another example, the UE 110 may be configured to perform rate matching around the LTE CRS for 5G NR PDCCH reception in the licensed spectrum. For example, the UE 110 may configure the baseband processor to perform rate matching around the LTE CRS when the UE 110 is to receive PDCCH in the licensed spectrum. In this example, the UE 110 may restrict the baseband processor from performing rate matching around the LTE CRS when the UE 110 is to receive PDCCH in the unlicensed spectrum (e.g., NR-U, sidelink, etc.). Thus, the UE 110 may implement rate matching around the LTE CRS based on receiving PDCCH via the licensed spectrum and omit rate matching around the LTE CRS based receiving PDCCH via the unlicensed spectrum.

In another example, the UE 110 may be configured to perform rate matching around the LTE CRS for 5G NR PDCCH reception based on the type of DCI that is to be received. The UE 110 may determine the type of DCI that is to be received based on information received from the network, as indicated in the DCI or in any other appropriate manner. In this example, the UE 110 may configure the baseband processor to perform rate matching around the LTE CRS when non-fallback DCI (e.g., DCI format 0_1, format 0_2, format 1_1, format 1_2, etc.) is to be received via the 5G NR PDCCH. The UE 110 may also restrict the baseband processor from performing rate matching around the LTE CRS when fallback DCI (e.g., DCI format 0_0, format 1_0, etc.) or special DCI (e.g., DCI format 2_x, etc.) is to be received. Thus, the UE 110 may implement rate matching around the LTE CRS based on receiving PDCCH based on a first type of DCI and omit rate matching around the LTE CRS based a second different type of DCI.

In a further example, the UE 110 may be configured to perform rate matching around the LTE CRS based on a radio network temporary identifier (RNTI). Those skilled in the art will understand that a UE may be assigned a variety of different RNTIs for a variety of different services. During operation, the network may transmit a signal to the UE that includes DCI scrambled with one of the RNTIs. Thus, the UE 110 may implement rate matching based on the RNTI used to scramble the DCI.

To provide an example, the UE 110 may configure the baseband processor to perform rate matching around the LTE CRS when the DCI is scrambled with an RNTI of a first group of RNTIs. In this example, the first group includes cell RNTI (C-RNTI), configured scheduling RNTI (CS-RNTI), modulation and coding scheme cell RNTI (MCS-C-RNTI). The UE 110 may restrict the baseband processor from performing rate matching around the LTE CRS when the DCI is scrambled with an RNTI from a second group of RNTIs. In this example, the second group includes system information RNTI (SI-RNTI), paging RNTI (P-RNTI), random access RNTI (RA-RNTI), temporary C-RNTI, an RNTI configured for MsgB reception (MsgB-RNTI), slot format indicator RNTI (SFI-RNTI), interruption RNTI (INT-RNTI), transmission power control physical uplink shared channel RNTI (TPC-PUSCH-RNTI), transmission power control physical uplink control channel RNTI (TPC-PUCCH-RNTI) and transmission power control sounding reference signal RNTI (TPC-SRS-RNTI). Thus, the UE 110 may implement rate matching around the LTE CRS based on receiving PDCCH scrambled with an RNTI from a first group of RNTIs and omit rate matching around the LTE CRS based receiving PDCCH scrambled with an RNTI from a second group of RNTIs. The above examples are merely provided for illustrative purposes and it is not intended to limit the exemplary embodiments in any way. The exemplary embodiments may apply to any number and type of RNTI being split into the first group and the second group for any appropriate reason.

In addition, the exemplary embodiments include implementing control resource set (CORESET) restrictions related to rate matching around the LTE CRS. As mentioned above, implementing these restrictions may enable an operator to satisfy DSS without placing unreasonable requirements on either the UE or the network.

In some embodiments, the UE 110 may only support rate matching around the LTE CRS for the reception of a CORESET with a precoder granularity of "all contiguous resource blocks (allContiguousRBs)." A CORESET configured with this parameter indicates that the DMRS symbols on all RBs allocated to the CORESET are transmitted with the same precoder. In one example, the network may assume that none of the UEs support a precoder granularity of "same as resource element group bundle (sameAsREG-bundle)." A CORESET configured with this parameter indicates that DMRS REs transmitted in the same REG-bundle are transmitted with the same precoder. Thus, the network may not transmit and/or expect the UE 110 to perform rate matching around the LTE CRS for a CORESET configured with a precoder granularity of sameAsREG-bundle based on this assumption.

In another example, the UE 110 may report whether the UE 110 supports rate matching around the LTE CRS for the reception of a CORESET configured with a precoder granularity parameter of sameAsREG-bundle. The UE 110 may report this capability in a capability information message or in any other appropriate type of message. Thus, the network may not transmit and/or expect the UE 110 to perform rate matching around the LTE CRS for a CORESET configured with a precoder granularity of sameAsREG-bundle when the UE 110 indicates that it does not support the corresponding capability.

In some embodiments, further restrictions may be imposed on the REG bundle size for the CORESET. For example, the UE 110 may configure the baseband processor to perform rate matching around the LTE CRS for a CORESET with a REG bundle size equal to (n6) and restrict the baseband processor from performing rate matching around the LTE CRS for a CORESET with a REG bundle size equal to (n2) or (n3). This restriction may be assumed by the network or indicated to the network by the UE 110. Thus, the network may not transmit and/or expect the UE 110 to perform rate matching around the LTE CRS for a CORESET configured with a particular REG bundle size.

In other embodiments, further restrictions may be imposed on interleaving of the CORESET. For example, the UE 110 may configure the baseband processor to perform rate matching around the LTE CRS for only a non-interleaved CORESET. In another example, the UE 110 may configure the baseband processor to perform rate matching around the LTE CRS for a CORESET with an interleaver size that is the same as the REG bundle size. These restrictions may be assumed by the network or indicated to the network by the UE 110. Thus, the network may not transmit and/or expect the UE 110 to perform rate matching around the LTE CRS for a CORESET configured in the manner describe above.

Figure 4:
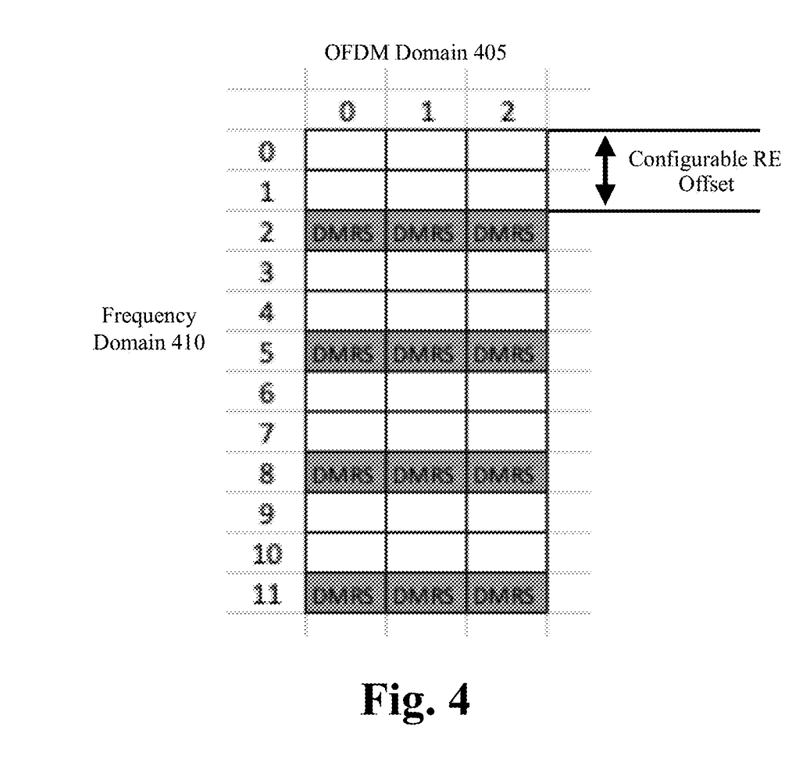
FIG. 4 shows an example of an exemplary PDCCH demodulation reference signal (DMRS) design according to various exemplary embodiments.

In a second aspect, the exemplary embodiments include an exemplary PDCCH DMRS design. FIG. 4 shows an example of an exemplary PDCCH DMRS design according to various exemplary embodiments.

In this example, the PDCCH is configured to be three symbols (0-2) in the orthogonal frequency division multiplexing (OFDM) domain 405 and twelve subcarriers (0-11) in the frequency domain 410. Those skilled in the art will understand that the PDCCH is not limited to this configuration and may vary in size in the frequency and/or OFDM domain.

To avoid a collision between the NR PDCCH DMRS and the LTE CRS, the NR PDCCH DMRS may be configured to include a DMRS every three subcarriers and in every PDCCH symbol. Thus, in this example, the DMRS exists in three consecutive OFDM symbols because the PDCCH is three OFDM symbols. This configurable RE offset is different than conventional PDCCH DMRS that is configured to include a DMRS every four subcarriers.

In addition, the exemplary NR PDCCH DMRS may be configured with a configurable resource element (RE) offset within the resource block (RB). This offset is not required to be static and may change on a per RB basis. Thus, at a first time, the UE 110 may receive PDCCH DMRS with an offset of (N) REs. At a second time, the UE 110 may receive PDCCH DMRS with an offset of (M) REs where (N) is not equal to (M). This configurable RE offset is different than conventional PDCCH DMRS that is configured with a fixed RE offset of one RE.

Figure 5:
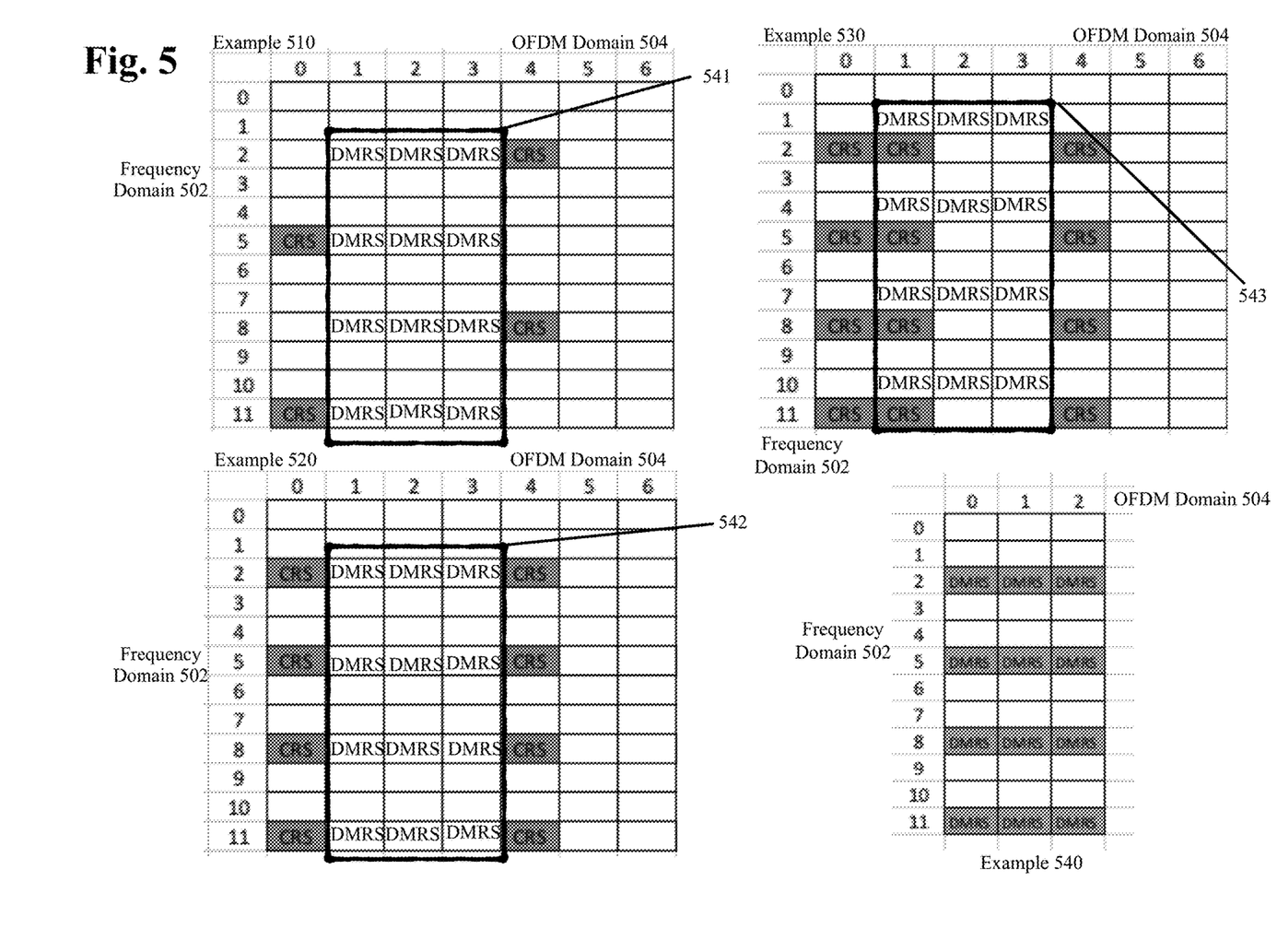
FIG. 5 shows three examples of long term evolution (LTE) cell specific reference signal (CRS) transmission and one example of 5G new radio (NR) PDCCH DMRS transmission according to various exemplary embodiments.

FIG. 5 shows three examples 510-530 of LTE CRS transmission and one example 540 of 5G NR PDCCH DMRS transmission according to various exemplary embodiments. The first example 510 illustrates one port CRS transmission. Here, a RE offset of physical cell identity (PCI) mod 6 is utilized. In addition, an LTE CRS symbol is configured to occur every six REs in the frequency domain 502 for symbols 0 and 4 in the OFDM domain 504. Although not shown in FIG. 5, symbols 7 and 11 may also be configured to include LTE CRS symbols.

The second example 520 illustrates two port CRS transmission. Here, a RE offset of (PCI mod 6) is utilized. In addition, an LTE CRS symbol is symbols to occur every three REs in the frequency domain 502 for slots 0 and 4 in the OFDM domain 504. Although not shown in FIG. 5, symbols 7 and 11 may also be configured to include LTE CRS symbols.

The third example 530 illustrates four port CRS transmission. Here, a RE offset of (PCI mod 6) is utilized. In addition, an LTE CRS symbol is configured to occur every three REs in the frequency domain 502 for symbols 0, 1 and 4 in the OFDM domain 504. Although not shown in FIG. 5, symbols 7, 8 and 11 may also be configured to include LTE CRS symbols. The above examples 510-530 are merely provided for illustrative purposes and are not intended to limit the exemplary embodiments in any way. Instead, the examples 510-530 provide a general example of three possible LTE CRS arrangements. Those skilled in the art will understand that the location of the LTE CRS symbols may be initially configured in a different manner and/or shift in the OFDM domain over time.

In some embodiments, to avoid a collision between the NR PDCCH DMRS and the LTE CRS, the network may configure the NR PDCCH DMRS 540 such that it does not exist within certain PDCCH symbols. In other words, the network may not configure 5G NR PDCCH DMRS in a frequency and time location (e.g. a RE) that is to be utilized for LTE CRS symbols.

Example 540 illustrates an exemplary 5G NR PDCCH DMRS transmission. The 5G NR PDCCH DMRS shown in example 540 is similar to the exemplary 5G NR PDCCH DMRS shown in FIG. 4. However, the exemplary technique mentioned above may also be applicable to legacy PDCCH DMRS configurations and future implementations of PDCCH DMRS configurations.

The network may configure the 5G NR PDCCH DMRS symbols shown in example 540 such that they do not exist in a RE that is configured to be used for LTE CRS transmissions. To provide an example within the context of example 510, the network may configure the 5G NR PDCCH DMRS to be located within the REs that are marked DMRS within the box 541 as shown in example 510.

To provide another example within the context of example 520, the network may configure the 5G NR PDCCH DMRS to be within the REs that are marked DMRS within the box 542 as shown in example 520. To provide a further example within the context of example 530, the network may configure the 5G NR PDCCH DMRS to be within the REs that are marked DMRS within the box 543 as shown in example 530. As mentioned above, the exemplary PDCCH DMRS may be equipped with a configurable RE offset. Thus, the RE offset shown in the box 543 is different than the RE offset shown in box 541, 542.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. An apparatus comprising processing circuitry configured to perform operations comprising:
   receiving information associated with a downlink reference signal for a first radio access technology (RAT), wherein the first RAT is different than a currently camped second RAT;
   identifying reference signal occasions for the downlink reference signal;
   receiving downlink control information from the second RAT via a physical downlink control channel (PDCCH); and
   generating, for transmission to the currently camped cell of the second RAT, user equipment (UE) capability information indicating a UE is configured to perform rate matching around LTE cell specific reference signal (CRS) during PDCCH reception and wherein the indication is of per band reporting type.

2. The apparatus of claim 1, wherein the operations further comprise:
   identifying a search space for the PDCCH;
   when the search space is configured after radio resource control (RRC) setup is complete, performing rate matching around the downlink reference signal for the first RAT when receiving the downlink control information from the second RAT via the PDCCH; and
   when the search space is configured prior to the RRC setup, not performing rate matching around the downlink reference signal for the first RAT when receiving the downlink control information from the second RAT via the PDCCH.

3. The apparatus of claim 1, wherein the operations further comprise:
   identifying a control resource set (CORESET) associated with the PDCCH;
   when the CORESET is configured after radio resource control (RRC) setup is complete, performing rate matching around the downlink reference signal for the first RAT when receiving the downlink control information from the second RAT via the PDCCH; and
   when the CORESET is configured prior to the RRC setup, not performing rate matching around the downlink reference signal for the first RAT when receiving the downlink control information from the second RAT via the PDCCH.

4. The apparatus of claim 1, wherein the operations further comprise:
   identifying a search space for the PDCCH;
   when the search space for the PDCCH is user equipment (UE) specific search space (USS), performing rate matching around the downlink reference signal for the first RAT when receiving the downlink control information from the second RAT via the PDCCH; and
   when the search space for the PDCCH is a common search space (CSS), not performing rate matching around the downlink reference signal for the first RAT when receiving the downlink control information from the second RAT via the PDCCH.

5. The apparatus claim 1, wherein the operations further comprise:
   identifying whether the PDCCH is for the licensed spectrum or the unlicensed spectrum;
   when the PDCCH is for the licensed spectrum, performing rate matching around the downlink reference signal for the first RAT when receiving the downlink control information from the second RAT via the PDCCH; and
   when the search space for the unlicensed spectrum, not performing rate matching around the downlink reference signal for the first RAT when receiving the downlink control information from the second RAT via the PDCCH.

6. The apparatus of claim 1, wherein the operations further comprise:
   identifying that the downlink control information is a type of downlink control information;
   when the type of downlink control information is a first type, performing rate matching around the downlink reference signal for the first RAT when receiving the downlink control information from the second RAT via the PDCCH; and
   when the type of downlink control information is a second type, not performing rate matching around the downlink reference signal for the first RAT when receiving the downlink control information from the second RAT via the PDCCH.

7. The apparatus of claim 6, wherein the first type of downlink control information is non-fallback downlink control information and wherein the second type of downlink control information is i) fallback downlink control information or ii) special downlink control information.

8. The apparatus of claim 1, wherein the operations further comprise:
   identifying that the downlink control information is scrambled with a radio network temporary identifier (RNTI) associated with a first group of RNTI or a second group of RNTI;
   when the RNTI is associated with the first group of RNTI, performing rate matching around the downlink reference signal for the first RAT when receiving the downlink control information from the second RAT via the PDCCH; and
   when the RNTI is associated with the second group of RNTI, not performing rate matching around the downlink reference signal for the first RAT when receiving the downlink control information from the second RAT via the PDCCH.

9. The apparatus of claim 1, wherein the first group of RNTI comprises at least one of a cell RNTI (C-RNTI), a configured scheduling (CS-RNTI), or a modulation and coding scheme cell RNTI (MCS-C-RNTI).

10. The apparatus claim 1, wherein the downlink control information is carried via a PDCCH with demodulation reference signal (DMRS) and wherein, for each symbol of the PDCCH, the PDCCH DMRS includes one DMRS resource element (RE) for every three resource elements (REs).

11. A user equipment (UE), comprising:
a transceiver configured to communicate with a network; and
a processor communicatively coupled to the transceiver and configured to perform operations comprising:
receiving information associated with a downlink reference signal for a first radio access technology (RAT), wherein the first RAT is different than a currently camped second RAT;
identifying reference signal occasions for the downlink reference signal;
receiving downlink control information from the second RAT via a physical downlink control channel (PDCCH); and
generating, for transmission to the currently camped cell of the second RAT, UE capability information indicating the UE is configured to perform rate matching around LTE cell specific reference signal (CRS) during PDCCH reception and wherein the indication is of per band reporting type.

12. The UE of claim 11, wherein the operations further comprise:
determining that a predetermined condition is satisfied, wherein receiving the downlink control information includes performing rate matching around the downlink reference signals of the first RAT based on the predetermined condition being satisfied.

13. The UE of claim 11, wherein the operations further comprise:
determining that a predetermined condition is satisfied;
when the predetermined condition is satisfied, transmitting an indication that the UE supports all contiguous resource blocks to a currently camped cell of the second RAT.

14. The UE of claim 13, wherein the indication further indicates whether the UE supports a control resource set (CORESET) precoder granularity parameter sameAsREGbundle.

15. The UE of claim 11, wherein, when a predetermined condition is satisfied, the downlink control information comprises a control resource set (CORESET) that is configured with a resource element group (REG) bundle size of n6.

16. The UE of claim 11, wherein, when a predetermined condition is satisfied, the downlink control information comprises a non-interleaved control resource set (CORESET).

17. The UE of claim 11, wherein, when a predetermined condition is satisfied, the downlink control information comprises a control resource set (CORESET) with an interleaver size that is the same as a resource element group (REG) bundle size.

18. The UE of claim 11, wherein the downlink control information is carried via a PDCCH with demodulation reference signal (DMRS) and wherein, for each symbol of the PDCCH, the PDCCH DMRS includes one DMRS resource element (RE) for every three resource elements (REs).

19. The UE of claim 11, wherein the downlink control information is a PDCCH demodulation reference signal (DMRS) that includes a configurable resource element offset.

20. A method, comprising:
receiving information associated with a downlink reference signal for a first radio access technology (RAT), wherein the first RAT is different than a currently camped second RAT;
identifying reference signal occasions for the downlink reference signal;
receiving downlink control information from the second RAT via a physical downlink control channel (PDCCH); and
transmitting, to the currently camped cell of the second RAT, user equipment (UE) capability information indicating a UE is configured to perform rate matching around LTE cell specific reference signal (CRS) during PDCCH reception and wherein the indication is of per band reporting type.

* * * * *